United States Patent
Kubo

(10) Patent No.: US 11,529,829 B2
(45) Date of Patent: Dec. 20, 2022

(54) PNEUMATIC TIRE AND TIRE MOLD

(71) Applicant: Sumitomo Rubber Industries, Ltd., Hyogo (JP)

(72) Inventor: Hokuto Kubo, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 44 days.

(21) Appl. No.: 16/998,189

(22) Filed: Aug. 20, 2020

(65) Prior Publication Data

US 2021/0053399 A1    Feb. 25, 2021

(30) Foreign Application Priority Data

Aug. 22, 2019  (JP) .............................. JP2019-152025

(51) Int. Cl.
*B60C 15/024*  (2006.01)
*B29D 30/48*   (2006.01)

(52) U.S. Cl.
CPC ............ *B60C 15/024* (2013.01); *B29D 30/48* (2013.01); *B29D 2030/487* (2013.01); *B60C 2015/0245* (2013.01)

(58) Field of Classification Search
CPC ... B60C 15/02; B60C 15/0226; B60C 15/024; B60C 15/0242; B60C 2015/0245
USPC ....................................................... 152/544
See application file for complete search history.

(56) References Cited

U.S. PATENT DOCUMENTS

| 2,587,470 | A |   | 2/1952 | Herzegh |
| 5,769,981 | A | * | 6/1998 | Turley ................. B60C 15/024 |
|           |   |   |        | 152/544 |

FOREIGN PATENT DOCUMENTS

| EP | 0774368 A1 | 5/1997 |
| EP | 3 450 218 A1 | 3/2019 |
| EP | 3 656 582 A1 | 5/2020 |
| GB | 785 094 A | 10/1957 |
| JP | H04-334610 A | 11/1992 |
| JP | H06-32123 A | 2/1994 |
| JP | 2007-022218 A | 2/2007 |
| JP | 2010-012829 A | 1/2010 |
| JP | 2014136415 A * | 7/2014 |
| JP | 2014-156192 A | 8/2014 |
| JP | 2017-074834 A | 4/2017 |

(Continued)

OTHER PUBLICATIONS

Eguchi, JP-2017209958-A, machine translation. (Year: 2017).*

(Continued)

*Primary Examiner* — Robert C Dye
*Assistant Examiner* — Sedef E Paquette
(74) *Attorney, Agent, or Firm* — Studebaker & Brackett PC

(57) ABSTRACT

A tire 22 includes a pair of bead portions 66 to be fitted to a rim R. Each bead portion 66 includes a bead 30 having a core 52 and an apex 54. An outer surface 68 of the bead portion 66 includes a seat face 70 and a flange face 72 disposed radially inward and axially outward, respectively, of the bead 30, a heel face 74 disposed between the seat face 70 and the flange face 72, and a plurality of vent lines 78 projecting from the heel face 74 and extending in the circumferential direction. A contour of the heel face 74 is represented by an arc on a cross-section, of the tire 22, taken along a plane including a rotation axis of the tire 22, and a radius Rh of the arc is not less than 8 mm and not greater than 15 mm.

6 Claims, 7 Drawing Sheets

(56) References Cited

FOREIGN PATENT DOCUMENTS

JP    2017209958 A  *  11/2017
JP    2020131535 A  *  8/2020

OTHER PUBLICATIONS

Ando T, JP-2020131535-A, machine translation. (Year: 2020).*
Uchida M, JP-2014136415-A, machine translation. (Year: 2014).*
The extended European search report issued by the European Patent Office dated Nov. 30, 2020, which corresponds to European Patent Application No. 20190680.7-1012 and is related to U.S. Appl. No. 16/998,189.

* cited by examiner

PNEUMATIC TIRE AND TIRE MOLD

BACKGROUND OF THE INVENTION

Field of the Invention

The present invention relates to a pneumatic tire and a tire mold.

Description of the Background Art

A bead portion of a tire is dropped into a well of a rim when the tire is mounted on the rim. The bead portion is moved along the rim in the axially outward direction when the tire is inflated with air. The bead portion is moved over a hump of the rim and is placed on a seat of the rim. The bead portion comes into contact with a flange of the rim, and mounting of the tire on the rim is completed.

An internal pressure of a tire in the case of a bead portion being moved over a hump is called a fitting pressure, and is used as an index that indicates how easily the tire is mounted on the rim. A force with which a tire mounted on a rim tightens the rim is called a bead unseating resistance, and is used as an index that indicates how difficult it is to unseat the tire from the rim. A well-balanced adjustment of a fitting pressure and a bead unseating resistance is examined in order to obtain a tire that is easily mounted on a rim and is not easily unseated from the rim (for example, Japanese Laid-Open Patent Publication No. 2017-74834).

FIG. 7 illustrates a cross-section of a bead portion 4 of a conventional tire 2. The bead portion 4 has a core 6 extending in the circumferential direction. The core 6 is formed by winding a steel wire.

An outer surface 8 of the bead portion 4 includes a seat face 10 opposing a seat of the rim, a flange face 12 opposing a flange of the rim, and a heel face 14 disposed between the seat face 10 and the flange face 12. The contour of the heel face 14 is represented by an arc. In FIG. 7, an arrow Rh represents a radius of the arc representing the contour of the heel face 14. Reference character Ph represents the center of the arc. As shown in FIG. 7, the center Ph of the arc representing the contour of the heel face 14 is disposed between the center CC of the core 6 and the heel face 14. The radius Rh of the arc representing the contour of the heel face 14 is less than a distance from the center CC of the core 6 to the heel face 14.

The contour of the outer surface 8 of the bead portion 4 reflects the shape of the rim. The radius Rh of the arc representing the contour of the heel face 14 is set to range from 5 to 7 mm in general.

When the tire 2 is mounted on a rim, the heel face 14 portion (also referred to as a heel) of the bead portion 4 may be caught by a hump. Such a tire 2 tends to have a high fitting pressure.

Increase of the inner diameter of the core 6 leads to reduction of a fitting pressure. In this case, the bead unseating resistance is reduced. In a case where the number of times the wire is wound is reduced, a fitting pressure is reduced. Also in this case, a bead unseating resistance is reduced.

In a case where the radius Rh of the arc representing the contour of the heel face 14 is set to be greater than 7 mm, the bead portion 4 may be inhibited from being caught by the hump and the fitting pressure is likely to be reduced. In this case, when the tire 2 is produced, discharge of air between a mold and the bead portion 4 is inhibited, and an appearance of the bead portion 4 may be degraded.

The present invention has been made in view of such circumstances, and an object of the present invention is to provide a pneumatic tire in which an appearance quality, a bead unseating resistance, and a fitting pressure are adjusted in a well-balanced manner.

SUMMARY OF THE INVENTION

A pneumatic tire according to one aspect of the present invention includes a pair of bead portions to be fitted to a rim. Each bead portion includes a bead, the bead having a ring-shaped core extending in a circumferential direction and an apex disposed radially outward of the core. An outer surface of the bead portion includes a seat face disposed radially inward of the bead, a flange face disposed axially outward of the bead, a heel face disposed between the seat face and the flange face, and a plurality of vent lines projecting from the heel face and extending in the circumferential direction. A contour of the heel face is represented by an arc on a cross-section, of the tire, taken along a plane including a rotation axis of the tire. A radius of the arc is not less than 8 mm and not greater than 15 mm.

Preferably, in the pneumatic tire, the outer surface of the bead portion includes a saw cut projecting from the heel face, and the saw cut connects between two adjacent ones of the vent lines.

Preferably, in the pneumatic tire, the number of the vent lines disposed in the heel face is two.

Preferably, in the pneumatic tire, a center of the core is disposed between a center of the arc and the heel face on a cross-section of the tire.

Preferably, in the pneumatic tire, the center of the arc is disposed inwardly of a center of a boundary between the core and the apex in an axial direction.

Preferably, in the pneumatic tire, a product of a nominal cross-sectional width and a nominal aspect ratio is not greater than 115 mm.

A tire mold according to one aspect of the present invention is directed to a mold for producing the pneumatic tire, and the tire mold includes a pair of bead rings for forming the bead portions. Each bead ring includes a bead forming surface for forming the outer surface of the bead portion. The bead forming surface has a plurality of vent line grooves for forming the plurality of vent lines. A contour of a portion, of the bead forming surface, corresponding to the heel face is represented by an arc, on a cross-section of the bead ring taken along a plane including a center axis corresponding to the rotation axis of the tire. A radius of the arc is not less than 8 mm and not greater than 15 mm.

Preferably, in the tire mold, a saw cut groove for forming the saw cut is formed in the bead forming surface, and the saw cut groove connects between two adjacent ones of the vent line grooves.

Preferably, in the tire mold, a vent hole for communicating between inside and outside of the mold is disposed at a position at which the saw cut groove and the vent line groove intersect each other.

Preferably, in the tire mold, a vent hole for communicating between inside and outside of the mold is disposed at a position apart from the vent line groove.

The present invention can provide a pneumatic tire in which an appearance quality, a bead unseating resistance, and a fitting pressure are adjusted in a well-balanced manner.

DESCRIPTION OF THE PREFERRED EMBODIMENTS

The present invention will be described below in detail based on preferred embodiments with reference where appropriate to the drawings.

In the present invention, a state where a tire is mounted on a normal rim, an internal pressure of the tire is adjusted to a normal internal pressure, and no load is applied to the tire is referred to as a normal state. In the present invention, unless otherwise specified, the dimension and the angle of each component of the tire are measured in the normal state.

The normal rim represents a rim defined by a standard with which the tire complies. Examples of the normal rim include the "standard rim" in the JATMA standard, the "Design Rim" in the TRA standard, and the "Measuring Rim" in the ETRTO standard.

The normal internal pressure represents an internal pressure defined by a standard with which the tire complies. Examples of the normal internal pressure include the "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard. In the case of a tire for a passenger car, the normal internal pressure is 180 kPa unless otherwise specified.

The normal load represents a load defined by a standard with which the tire complies. Examples of the normal load include the "maximum load capacity" in the JATMA standard, the "maximum value" recited in "TIRE LOAD LIMITS AT VARIOUS COLD INFLATION PRESSURES" in the TRA standard, and the "LOAD CAPACITY" in the ETRTO standard.

Figure 1:
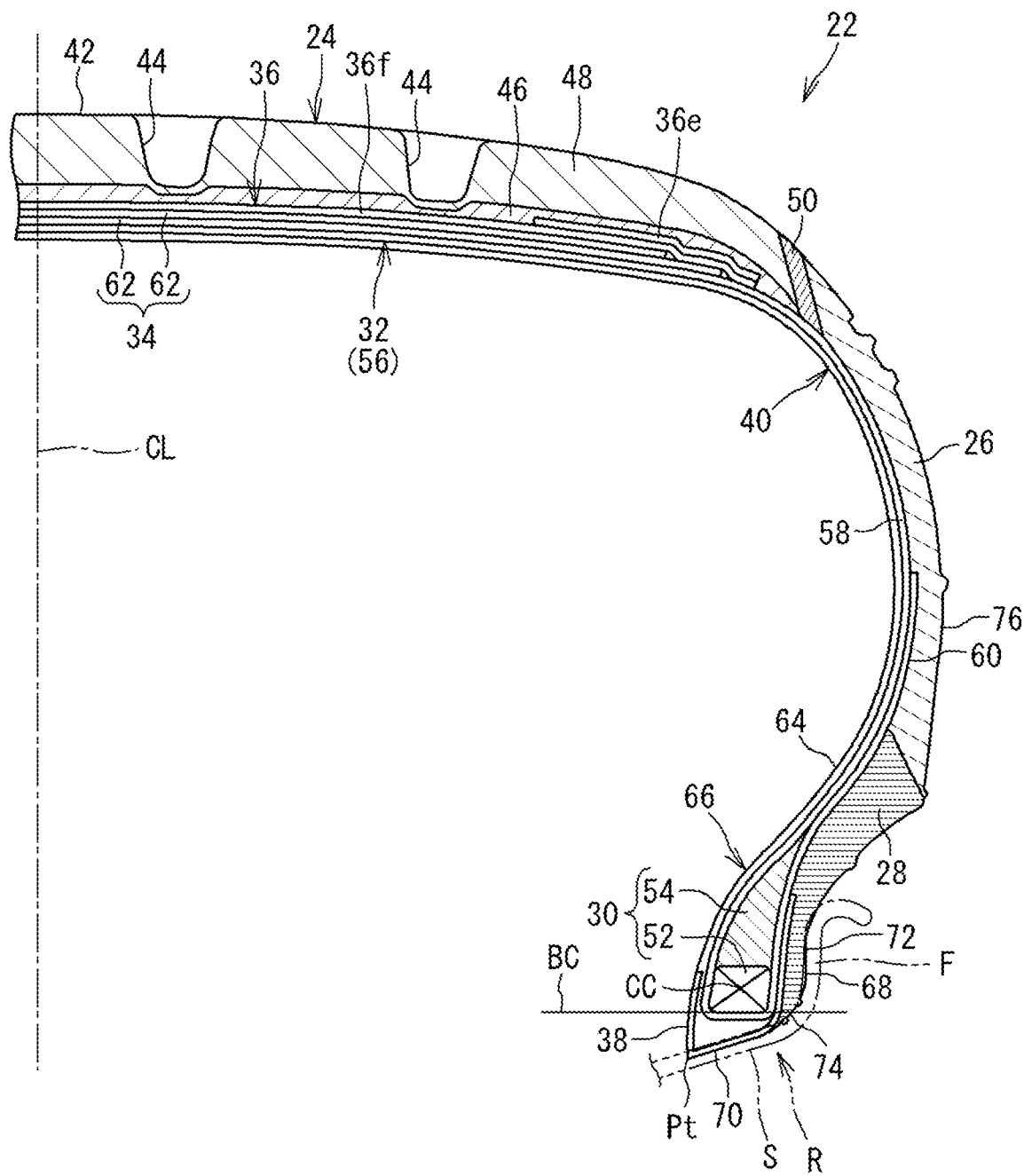
FIG. 1 is a cross-sectional view of a part of a pneumatic tire according to one embodiment of the present invention.

FIG. 1 illustrates a part of a pneumatic tire 22 (hereinafter, may be simply referred to as a "tire 22") according to one embodiment of the present invention. The tire 22 is mounted to a passenger car. In FIG. 1, a rim (normal rim) on which the tire 22 is mounted is indicated by an alternate long and two short dashes line R. The rim R includes a seat S that comes into contact with the tire 22 from the radially inner side, and a flange F that comes into contact with the tire 22 from the radially outer side.

FIG. 1 illustrates a part of a cross-section, of the tire 22, taken along a plane including the rotation axis of the tire 22. In FIG. 1, the left-right direction represents the axial direction of the tire 22, and the up-down direction represents the radial direction of the tire 22. The direction perpendicular to the drawing sheet surface in FIG. 1 represents the circumferential direction of the tire 22. In FIG. 1, an alternate long and short dash line CL represents the equator plane of the tire 22.

The tire 22 includes a tread 24, a pair of sidewalls 26, a pair of clinches 28, a pair of beads 30, a carcass 32, a belt 34, a band 36, a pair of chafers 38, and an inner liner 40.

The tread 24 comes into contact with a road surface on an outer surface 42. The outer surface 42 is a tread surface. The tread surface 42 has grooves 44 formed therein in general. In the tire 22, the tread 24 has a base portion 46, and a cap portion 48 disposed radially outward of the base portion 46. The base portion 46 is formed of crosslinked rubber for which heat generation property is taken into consideration. The cap portion 48 is formed of crosslinked rubber for which wear resistance and grip performance are taken into consideration.

Each sidewall 26 is disposed radially inward of the end of the tread 24. The sidewall 26 is formed of crosslinked rubber. The sidewalls 26 protect the carcass 32. As shown in FIG. 1, in the tire 22, the tread 24 and each sidewall 26 are connected to each other via a wing 50.

Each clinch 28 is disposed radially inward of the sidewall 26. As shown in FIG. 1, the clinch 28 comes into contact with the flange F of the rim R. The clinch 28 is formed of crosslinked rubber for which wear resistance is taken into consideration.

Each bead 30 is disposed axially inward of the clinch 28. The bead 30 includes a core 52 and an apex 54. The core 52 extends in the circumferential direction. The core 52 is ring-shaped. The core 52 includes a steel wire. The wire is a single wire. The outer diameter of the wire is not less than 0.8 mm and not greater than 1.6 mm. The apex 54 is disposed radially outward of the core 52. The apex 54 is tapered radially outward. The apex 54 is formed of crosslinked rubber having a high stiffness.

In the tire 22, the core 52 is formed by winding the wire in the circumferential direction multiple times, which is not shown. The cross-section of the core 52 includes multiple wire cross-sections. On the cross-section of the core 52, a plurality of units in each of which a plurality of wire cross-sections are aligned in the almost axial direction are formed, and these units are stacked in the almost radial direction. The contour (that is, cross-sectional shape) of the cross-section of the core 52 is represented by a line that circumscribes the core 52.

In the tire 22, the core 52 has a plurality of faces extending in the circumferential direction. As shown in FIG. 1, the core 52 of the tire 22 has four faces. The core 52 has a rectangular cross-sectional shape. The cross-sectional shape is not particularly limited, and the cross-sectional shape may be, for example, hexagonal.

In the tire 22, one face of the plurality of faces of the outer surface of the core 52 is disposed on the radially inner side. In a state where the tire 22 is mounted on the rim R, the one face opposes the seat S of the rim R. In the tire 22, a face that is included in the plurality faces of the core 52, is disposed on the radially inner side, and opposes the seat S of the rim R, is also referred to as a reference plane of the core 52. In FIG. 1, a solid line BC represents a reference line, of the core 52, which includes the reference plane of the core 52.

In FIG. 1, reference character CC represents the center of the core 52. The center CC of the core 52 is represented as the center position of the axial width of the core 52 at a position at which the thickness of the core 52 represented as a distance in the radial direction from the radially outer end to the radially inner end of the core 52, is halved.

The carcass 32 is disposed inward of the tread 24, the pair of sidewalls 26, and the pair of clinches 28. The carcass 32 extends from one of the beads 30 toward the other of the beads 30. The carcass 32 includes at least one carcass ply 56.

The carcass 32 of the tire 22 is formed of one carcass ply 56. The carcass ply 56 includes a body portion 58 extended on and between one of the cores 52 and the other of the cores 52, and a pair of turned-up portions 60 that are continuous with the body portion 58 and are turned up around the corresponding cores 52 from the inner side toward the outer side in the axial direction.

The carcass ply 56 includes multiple carcass cords aligned with each other, which are not shown. The carcass cords intersect the equator plane. In the tire 22, a cord formed of an organic fiber is used as the carcass cord.

The belt 34 is disposed radially inward of the tread 24 and stacked over the carcass 32. The belt 34 is formed of at least two layers of belt plies 62 that are stacked in the radial direction.

In the tire 22, the belt 34 is formed of two layers of the belt plies 62. The belt plies 62 forming the two layers each include multiple belt cords aligned with each other, which are not shown. These belt cords are inclined relative to the equator plane. The material of the belt cord is steel.

The band 36 is disposed inward of the tread 24 in the radial direction. The band 36 is disposed between the tread 24 and the belt 34 in the radial direction. In the tire 22, the band 36 includes a full band 36f covering the entirety of the belt 34 and a pair of edge bands 36e covering the end portions of the full band 36f.

The band 36 includes a band cord, which is not shown. In each of the full band 36f and the edge bands 36e, the band cord is helically wound in the circumferential direction. A cord formed of an organic fiber is used as the band cord.

Each chafer 38 covers three sides, of the core 52, including the reference plane of the core 52. The chafer 38 includes a fabric and rubber impregnated into the fabric. As shown in FIG. 1, a portion, of the chafer 38, which is disposed radially inward of the core 52 comes into contact with the seat S of the rim R. The axially outer side portion of the chafer 38 is disposed between the turned-up portion 60 and the clinch 28. The axially inner side portion of the chafer 38 forms a part of an inner surface 64 of the tire 22.

The inner liner 40 is disposed inward of the carcass 32. The inner liner 40 forms a part of the inner surface 64 of the tire 22. The inner liner 40 is formed of crosslinked rubber having excellent airtightness. The inner liner 40 maintains internal pressure of the tire 22.

In the tire 22, a portion (hereinafter, bead portion 66) including the bead 30 is fitted onto the rim R. The tire 22 includes a pair of bead portions 66 to be fitted onto the rim R. Each bead portion 66 includes the bead 30. An outer surface 68 of the bead portion 66 includes a seat face 70, a flange face 72, and a heel face 74. The seat face 70 is disposed radially inward of the bead 30. The flange face 72 is disposed axially outward of the bead 30. The heel face 74 is disposed between the seat face 70 and the flange face 72. In a state where the tire 22 is mounted on the rim R, the seat face 70 opposes the seat S, the flange face 72 opposes the flange F, and the heel face 74 opposes a boundary portion between the seat S and the flange F.

Figure 2:
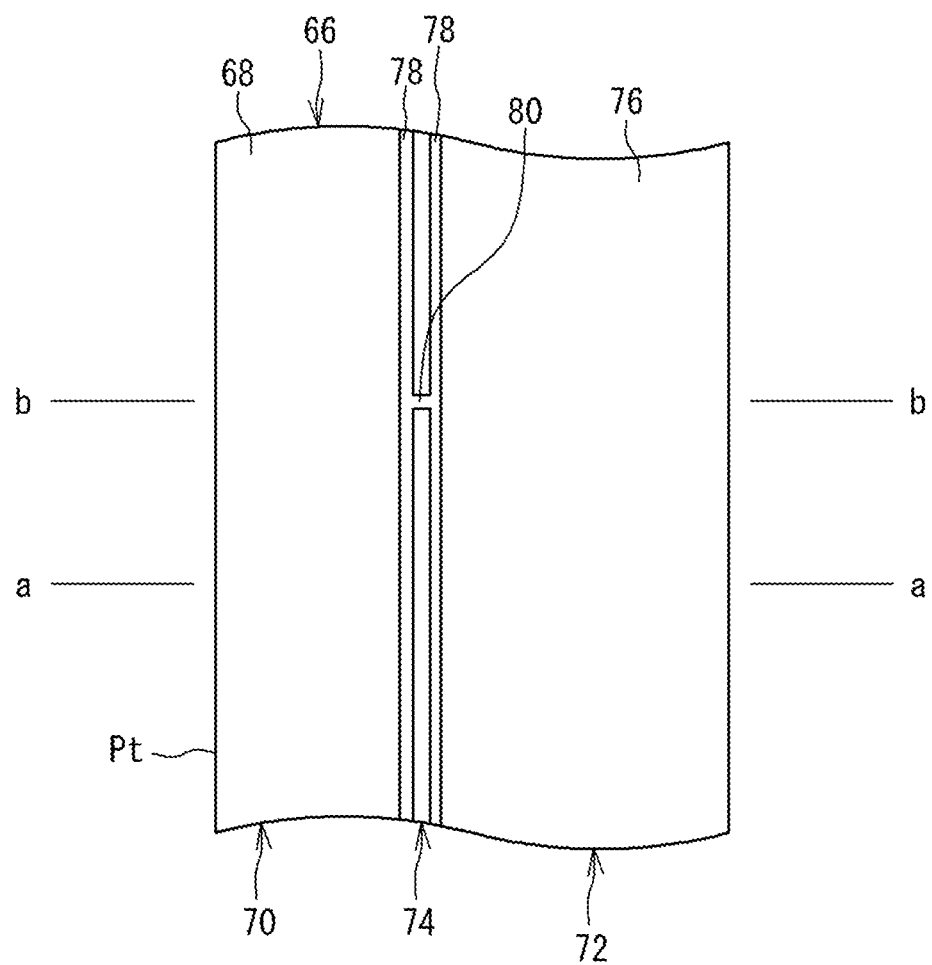
FIG. 2 is a schematic diagram illustrating an outer surface of a bead portion.

FIG. 2 illustrates the outer surface 68 of the bead portion 66 as schematically viewed from the radially inner side. In FIG. 2, the up-down direction represents the circumferential direction of the tire 22, and the left-right direction represents the axial direction of the tire 22. The right side on the drawing sheet surface corresponds to the axially outer side of the tire 22. In FIG. 2, reference character Pt represents a toe of the tire 22. The toe Pt is disposed on the radially inner side of the tire 22, and is a boundary between the inner surface 64 and an outer surface 76 of the tire 22.

Figure 3A:
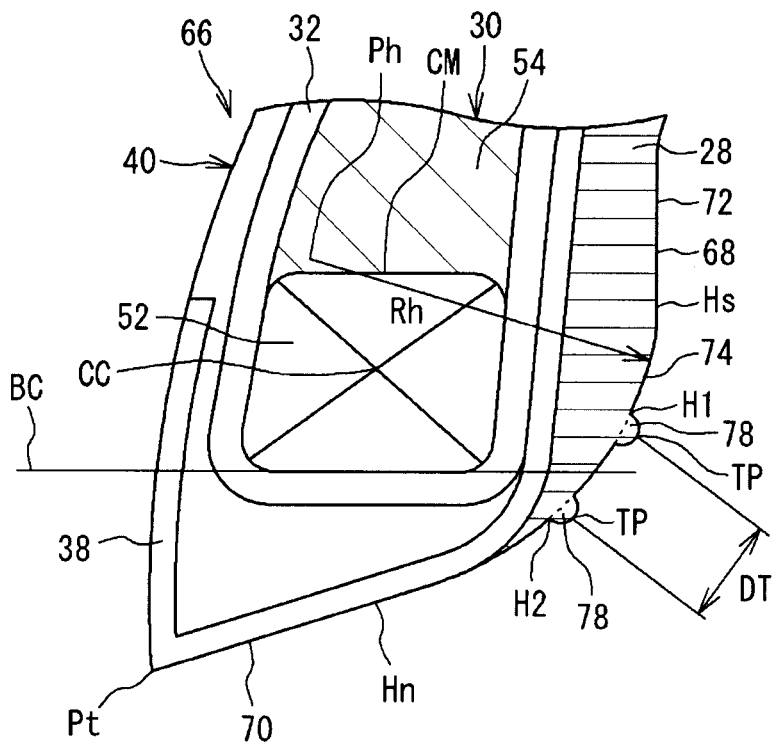
FIG. 3A is a cross-sectional view taken along a line a-a in FIG. 2.
Figure 3B:
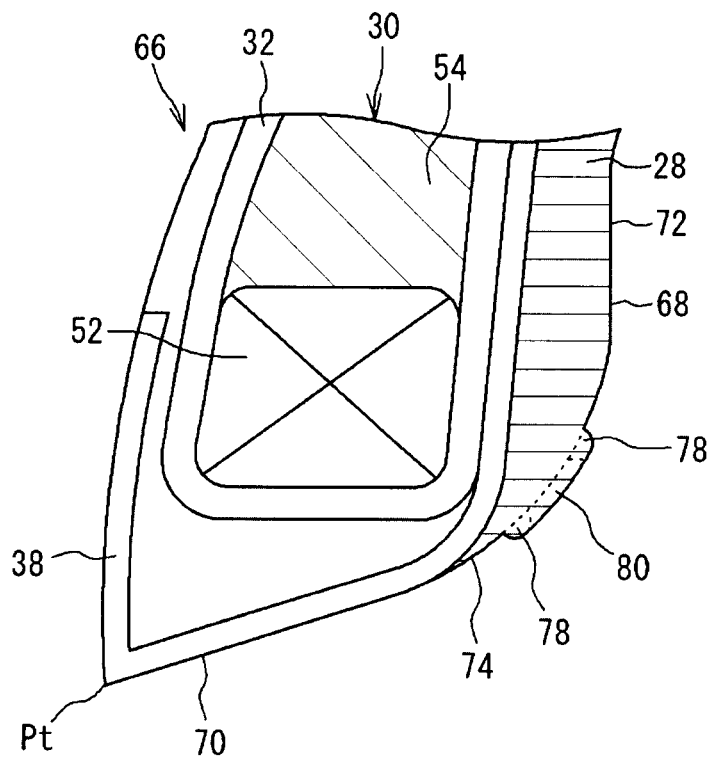
FIG. 3B is a cross-sectional view taken along a line b-b in FIG. 2.

FIGS. 3A and 3B illustrate a cross-section of the bead portion 66. In FIGS. 3A and 3B, the up-down direction represents the radial direction of the tire 22, and the left-right direction represents the axial direction of the tire 22. The direction perpendicular to the drawing sheet surface represents the circumferential direction of the tire 22. FIG. 3A illustrates a cross-section taken along a line a-a in FIG. 2, and FIG. 3B illustrates a cross-section taken along a line b-b in FIG. 2. The cross-section of the bead portion 66 shown in FIGS. 3A and 3B represents a cross-section of the bead portion 66 taken along a plane including the rotation axis of the tire 22.

In the tire 22, the outer surface 68 of the bead portion 66 includes a plurality of projections 78 extending in the circumferential direction on the heel face 74 portion. The projections 78 project from the heel face 74. In the tire 22, the projection 78 projecting from the heel face 74 and extending in the circumferential direction is called a vent line. The outer surface 68 of the bead portion 66 includes a plurality of vent lines 78 projecting from the heel face 74 and extending in the circumferential direction in addition to the seat face 70, the flange face 72, and the heel face 74. In the tire 22, two vent lines 78 are disposed in the heel face 74 portion. The material of these vent lines 78 is the same as that of the clinch 28.

In the tire 22, one of the vent lines 78 and the other of the vent lines 78 are spaced from each other. In the tire 22, for example, as shown in FIG. 2, a projection 80 may be disposed on the heel face 74 so as to connect between the two adjacent vent lines 78. As shown in FIG. 3B, the projection 80 projects from the heel face 74. In the tire 22, the projection 80 that projects from the heel face 74 so as to connect between the two adjacent vent lines 78 is called a saw cut. In the tire 22, a plurality of the saw cuts 80 is provided. The saw cuts 80 are spaced from each other in the circumferential direction. The material of the saw cut 80 is the same as that of the clinch 28.

The above-described tire 22 is produced as follows. In a case where the tire 22 is produced, components such as the tread 24, the sidewalls 26, and the beads 30 which form the tire 22 are combined in a forming machine (not shown) to prepare an unvulcanized tire 22 (hereinafter, also referred to as a green tire 22r), although the detailed description is not provided. The green tire 22r is pressurized and heated in a mold in a vulcanizer (not shown) to obtain the tire 22. In a case where the tire 22 is produced, vulcanization conditions such as the temperature, the pressure, and a time are not particularly limited, and the vulcanization conditions set for a conventional tire 2 can be adopted.

Figure 4:
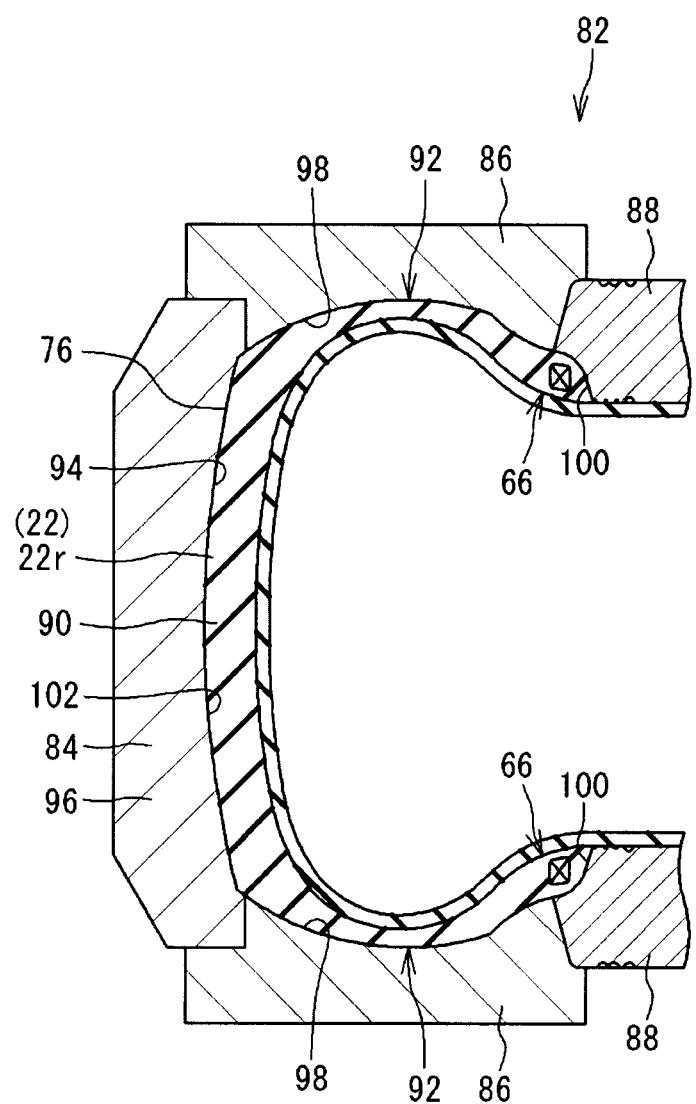
FIG. 4 is a cross-sectional view of a part of a tire mold according to one embodiment of the present invention.

FIG. 4 illustrates an example of a mold 82 used for producing the tire 22. In FIG. 4, the up-down direction corresponds to the axial direction of the tire 22. The left-right direction corresponds to the radial direction of the tire 22. The direction perpendicular to the drawing sheet surface corresponds to the circumferential direction of the tire 22. For convenience of description, the dimensions of the mold 82 are represented by the dimensions of the tire 22.

The mold 82 is a segmented mold. The mold 82 forms the outer surface 76 of the tire 22. The mold 82 includes a tread ring 84, a pair of side plates 86, and a pair of bead rings 88. The tread ring 84 forms the tread 24 portion (hereinafter, tread portion 90) of the tire 22. The side plate 86 forms a portion (hereinafter, also referred to as a side portion 92) from the end portion of the tread portion 90 to the end portion of the bead portion 66. The bead ring 88 forms the bead portion 66 of the tire 22. The mold 82 shown in FIG.

4 is formed into, that is, a closed state by combining the tread ring 84, the pair of side plates 86, and the pair of bead rings 88.

The tread ring 84 has a tread forming surface 94 on the inner surface. The tread forming surface 94 forms the outer surface of the tread portion 90. The tread ring 84 of the mold 82 is formed of multiple segments 96. The segments 96 are disposed so as to be ring-shaped.

Each side plate 86 is disposed radially inward of the tread ring 84. The side plate 86 is ring-shaped. The side plate 86 includes a sidewall forming surface 98 on the inner surface. The sidewall forming surface 98 forms the outer surface of the side portion 92.

Each bead ring 88 is disposed radially inward of the side plate 86. The bead ring 88 is ring-shaped. The bead ring 88 includes a bead forming surface 100 on the inner surface. The bead forming surface 100 forms the outer surface 68 of the bead portion 66.

In the mold 82, the multiple segments 96, the pair of side plates 86, and the pair of bead rings 88 are combined with each other, to form a cavity surface 102 for forming the outer surface 76 of the tire 22. The cavity surface 102 is formed by the tread forming surface 94, the pair of sidewall forming surfaces 98, and the pair of bead forming surfaces 100.

Figure 5:
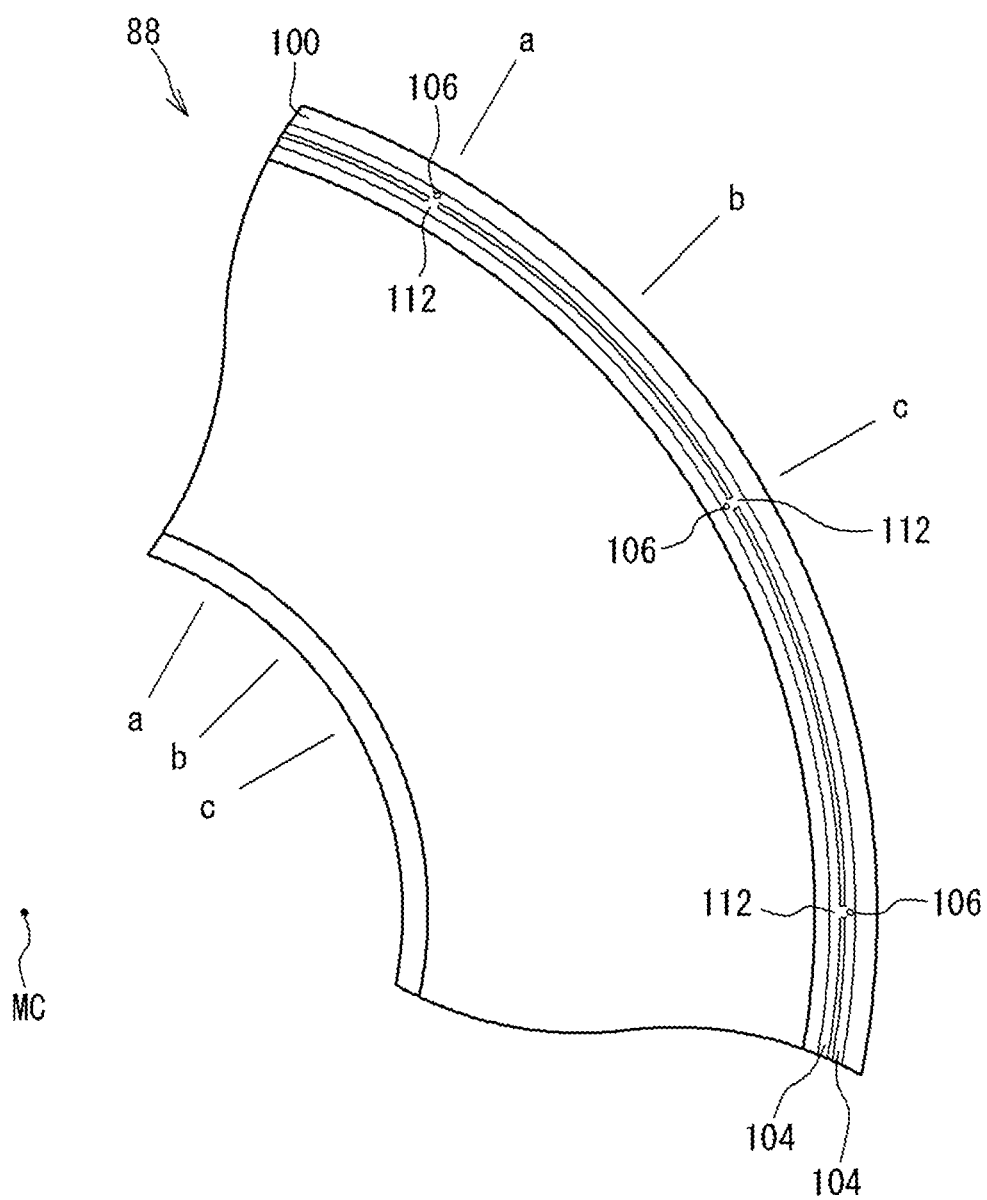
FIG. 5 is a plan view of a part of a bead ring.

FIG. 5 illustrates a part of the bead ring 88. In FIG. 5, the direction perpendicular to the drawing sheet surface corresponds to the axial direction of the tire 22. As shown in FIG. 5, the bead forming surface 100 extends in the circumferential direction. In FIG. 5, reference character MC represents the center axis of the bead ring 88. The center axis MC conforms to the center axis of the mold 82. The center axis of the mold 82 corresponds to the rotation axis of the tire 22. In FIG. 5, a line a-a, a line b-b, and a line c-c are straight lines extending through the center axis MC in the radial direction.

Figure 6A:
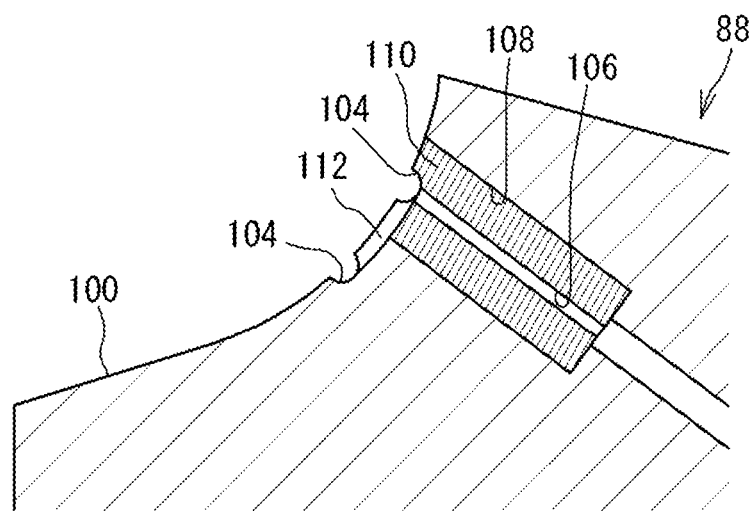
FIG. 6A is a cross-sectional view taken along a line a-a in FIG. 5.
Figure 6B:
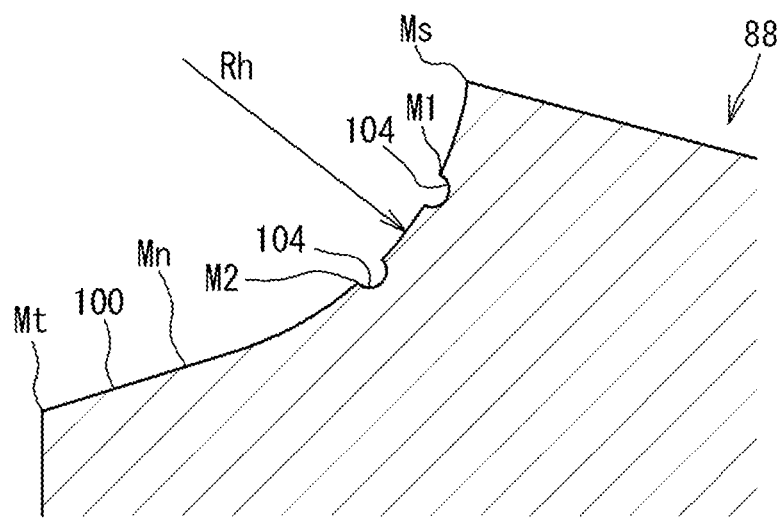
FIG. 6B is a cross-sectional view taken along a line b-b in FIG. 5.
Figure 6C:
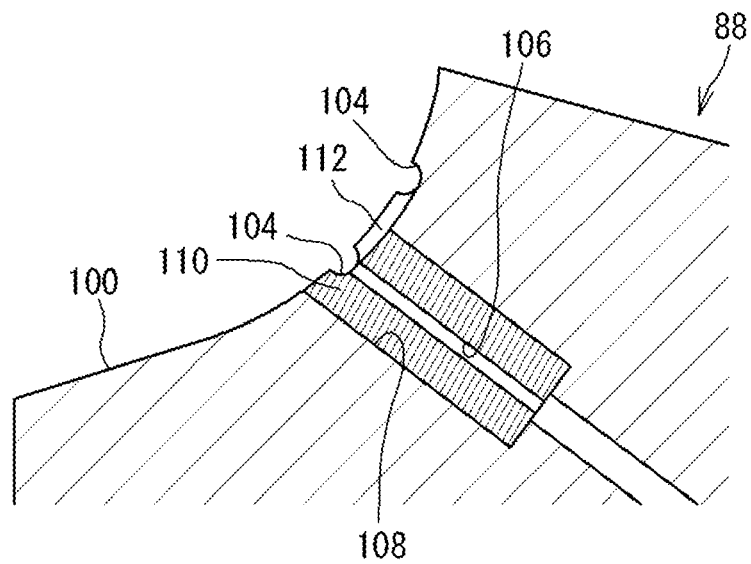
FIG. 6C is a cross-sectional view taken along a line c-c in FIG. 5.

FIGS. 6A to 6C illustrates a cross-section of the bead ring 88 taken along a plane including the center axis of the bead ring 88. In FIGS. 6A to 6C, the up-down direction corresponds to the radial direction of the tire 22, and the left-right direction corresponds to the axial direction of the tire 22. The direction perpendicular to the drawing sheet surface corresponds to the circumferential direction of the tire 22. FIG. 6A illustrates a cross-section taken along the line a-a in FIG. 5. FIG. 6B illustrates a cross-section taken along the line b-b in FIG. 5. FIG. 6C illustrates a cross-section taken along the line c-c in FIG. 5.

In FIG. 6B, reference character Ms represents the outer end of the bead forming surface 100. The outer end Ms is a boundary between the sidewall forming surface 98 of the side plate 86 and the bead forming surface 100. Reference character Mt represents an inner end of the bead forming surface 100. The inner end Mt corresponds to the toe Pt of the tire 22.

In the mold 82, the bead forming surface 100 includes a plurality of grooves 104 that extends in the circumferential direction, in a portion corresponding to the heel face 74 of the bead portion 66. The grooves 104 form the vent lines 78 described above. In the mold 82, the groove 104 provided in the bead forming surface 100 for forming the vent line 78 is called a vent line groove. In the mold 82, the bead forming surface 100 has a plurality of the vent line grooves 104 for forming a plurality of the vent lines 78. The bead forming surface 100 shown in FIGS. 5 to 6C have two vent line grooves 104 formed therein.

In the mold 82, the width of the vent line groove 104 is set to be not less than 0.3 mm and not greater than 1 mm. The depth of the vent line groove 104 is set to be not less than 0.3 mm and not greater than 1 mm. The vent line groove 104 has a semi-circular cross-sectional shape.

In the mold 82, the vent line groove 104 is connected to a vent hole 106 for communicating between the inside and the outside of the mold 82. As shown in FIGS. 6A to 6C, the vent hole 106 is formed by inserting a known vent piece 110 in a hole 108 formed in the body of the bead ring 88. In the mold 82, a plurality of the vent holes 106 is formed. In the tire 22, as shown in FIG. 5, these vent holes 106 are disposed in the circumferential direction alternately in the outer-side vent line grooves 104 and the inner-side vent line grooves 104.

In the mold 82, one of the vent line grooves 104 and the other of the vent line grooves 104 are spaced from each other. In the mold 82, for example, as shown in FIG. 5, a groove 112 connecting between the two adjacent vent line grooves 104 can be disposed in the bead forming surface 100. The groove 112 forms the saw cut 80 described above. In the mold 82, the groove 112 connecting between the two adjacent vent line grooves 104 is called a saw cut groove. In the mold 82, a plurality of the saw cut grooves 112 is disposed. The saw cut grooves 112 are spaced from each other in the circumferential direction.

In the mold 82, the width of the saw cut groove 112 is set to be not less than 0.3 mm and not greater than 1 mm. The depth of the saw cut groove 112 is set to be not less than 0.3 mm and not greater than 1 mm. The saw cut groove 112 has a semi-circular cross-sectional shape.

The tire 22 is mounted on the rim R when used. The contour of the heel face 74 of the bead portion 66 is represented by an arc from the viewpoint that the tire 22 is easily mounted on the rim R.

In the present invention, the contour of the outer surface 76 of the tire 22 is specified based on the cavity surface 102 of the mold 82. The contour of the outer surface 68 of the bead portion 66 shown in FIGS. 3A and 3B will be described with reference to the contour of the bead forming surface 100 of the bead ring 88 shown in FIGS. 6A to 6C.

In FIGS. 3A and 3B, an arrow Rh represents the radius of the arc representing the contour of the heel face 74 of the tire 22. Reference character Ph represents the center of the arc. In the tire 22, a portion, of the outer surface 68 of the bead portion 66, represented by the arc having the radius Rh is the heel face 74. In FIGS. 3A and 3B, reference character Hs represents the outer end of the heel face 74. The outer end Hs of the heel face 74 is a boundary between the heel face 74 and the flange face 72. In FIGS. 6A to 6C, the outer end Ms of the bead forming surface 100 corresponds to the outer end Hs of the heel face 74. As described above, the outer end Ms of the bead forming surface 100 is a boundary between the sidewall forming surface 98 and the bead forming surface 100. Therefore, the outer end Hs of the heel face 74 is specified by a portion corresponding to the boundary between the bead forming surface 100 and the sidewall forming surface 98.

In FIGS. 3A and 3B, reference character Hn represents the inner end of the heel face 74. The inner end Hn of the heel face 74 is a boundary between the heel face 74 and the seat face 70. In FIGS. 6A to 6C, a position corresponding to the inner end Hn of the heel face 74 is represented by reference character Mn as a position corresponding to the inner end of the heel face 74.

In FIGS. 3A and 3B, reference character H1 represents a boundary between the heel face 74 and the vent line 78 disposed on the flange face 72 side. In FIGS. 6A to 6C, a boundary M1 between the bead forming surface 100 and the vent line groove 104 disposed on the outer end Ms side corresponds to the boundary H1. Reference character H2 represents a boundary between the heel face 74 and the vent line 78 disposed on the seat face 70 side. In FIGS. 6A to 6C, a boundary M2 between the bead forming surface 100 and the vent line groove 104 disposed on the inner end Mt side corresponds to the boundary H2.

As described above, the contour of the heel face 74 of the tire 22 is represented by an arc. Therefore, on the cross-section of the bead ring 88 shown in FIGS. 6A to 6C, the arc extending through the outer end Ms, the boundary M1, and the boundary M2 of the bead forming surface 100 is obtained, thereby specifying the positions of the radius Rh and the center Ph of the arc representing the contour of the heel face 74. A position at which the arc representing the contour of the heel face 74 is away from the bead 30 forming surface, that is, the portion Mn corresponding to the inner end of the heel face 74 is obtained, thereby specifying the inner end Hn of the heel face 74. In the bead forming surface 100, a zone from the outer end Ms to the portion Mn corresponding to the inner end of the heel face 74 is a portion, of the bead forming surface 100, corresponding to the heel face 74.

In the tire 22, on the cross-section taken along the plane including the rotation axis, the contour of the heel face 74 of the bead portion 66 is represented by an arc having a radius that is relatively greater than that of a conventional tire 2. The radius Rh of the arc representing the contour of the heel face 14 is set to range from 5 to 7 mm in general. However, in the tire 22, the radius Rh of the arc representing the contour of the heel face 74 is not less than 8 mm and not greater than 15 mm. In other words, in the mold 82, on the cross-section of the bead ring 88 taken along the plane including the center axis corresponding to the rotation axis of the tire 22, the contour of the portion, of the bead forming surface 100, corresponding to the heel face 74 is represented as an arc, and the radius Rh of the arc is not less than 8 mm and not greater than 15 mm.

In the tire 22, the heel face 74 has a shape that is gently rounded as compared with a conventional heel face 14. Therefore, when the bead portion 66 is moved over the hump of the rim R, the bead portion 66 is inhibited from being caught by the hump. The bead portion 66 is not easily caught by the hump, so that the tire 22 can have a reduced fitting pressure.

In the tire 22, the structure of the core 6 need not be changed as in a conventional tire 2 in order to reduce the fitting pressure. In the tire 22, the fitting pressure can be reduced without reducing the bead unseating resistance.

In the tire 22, the heel face 74 has a shape that is gently rounded as compared with a conventional heel face 14. Therefore, in a case where the tire 22 is produced, discharge of air between the mold 82 and the bead portion 66 is inhibited, and an appearance of the bead portion 66 may be degraded.

However, as described above, in the mold 82 for the tire 22, a plurality of the vent line grooves 104 instead of one vent line groove 104 is disposed at the portion, of the bead forming surface 100, corresponding to the heel face 74. Through the vent line grooves 104, air between the mold 82 and the bead portion 66 is sufficiently discharged. Therefore, the bead portion 66 having an appearance required as a product is obtained.

In a case where a plurality of the vent lines 78 is disposed on the heel face 74, when the tire 22 is mounted on the rim R, the vent line 78 of the heel face 74 may be caught by the hump to increase a fitting pressure.

However, in the tire 22, the heel face 74 has a shape that is gently rounded as compared with a conventional heel face 14. Therefore, although the heel face 74 has a plurality of the vent lines 78, the fitting pressure can be reduced as compared with a conventional tire 2.

In the tire 22, the appearance quality, the bead unseating resistance, and the fitting pressure are adjusted in a well-balanced manner.

As described above, in the tire 22, the heel face 74 has the saw cut 80 connecting between the two adjacent vent lines 78. In the mold 82, the saw cut groove 112 that connects between the two adjacent vent line grooves 104 for forming the saw cut 80 is disposed in the bead forming surface 100. The saw cut groove 112 promotes discharge of air. The saw cut groove 112 contributes to reduction of the number of the vent holes 106 formed in the bead forming surface 100. From the viewpoint of obtaining the appearance quality required as a product, the tire 22 preferably includes the saw cut 80 formed by the outer surface 68 of the bead portion 66 projecting from the heel face 74, and the saw cut 80 preferably connects between the two adjacent vent lines 78. In the mold 82, the bead forming surface 100 preferably includes the saw cut groove 112 for forming the saw cut 80, and the saw cut groove 112 preferably connects between the two adjacent vent line grooves 104. In this case, as shown in FIG. 5 and FIGS. 6A to 6C, the vent hole 106 communicating between the inside and the outside of the mold 82 is more preferably disposed at a position at which the saw cut groove 112 and the vent line groove 104 intersect each other. In this case, an interval between the vent holes 106 provided in one vent line grooves 104 is set to be not less than 100 mm and not greater than 160 mm.

As described above, in the tire 22, the heel face 74 has a plurality of the vent lines 78. In the tire 22, three or more vent lines 78 may be disposed. In a case where multiple vent lines 78 are disposed in the heel face 74, the fitting pressure may increase. From this viewpoint, the number of the vent lines 78 disposed on the heel face 74 of the tire 22 is preferably not greater than four and more preferably not greater than three. In particular, in a case where the saw cut groove 112 is disposed in addition to the vent line grooves 104, the saw cut groove 112 effectively contributes to discharge of air. Therefore, the sufficient number of the vent line grooves 104 provided in the bead forming surface 100 is two. From this viewpoint, the number of the vent lines 78 disposed in the heel face 74 of the tire 22 is more preferably two.

As shown in FIGS. 3A and 3B, in the tire 22, the center CC of the core 52 is disposed between the heel face 74 and center Ph of the arc representing the contour of the heel face 74. In the bead portion 66 of the tire 22, a volume of the portion from the core 52 to the heel face 74 is effectively reduced. In the tire 22, when the tire 22 is mounted on the rim R, deformation of the heel face 74 portion is effectively reduced. Therefore, when the bead portion 66 is moved over the hump of the rim R, the bead portion 66 is effectively inhibited from being caught by the hump. The tire 22 allows the fitting pressure to be further reduced. From this viewpoint, in the tire 22, the center CC of the core 52 is preferably disposed between the heel face 74 and the center Ph of the arc representing the contour of the heel face 74.

In FIGS. 3A and 3B, reference character CM represents the center, in the axial direction, of the boundary between the core 52 and the apex 54. As shown in FIGS. 3A and 3B, in the tire 22, the center Ph of the arc representing the contour of the heel face 74 is disposed inwardly of the center CM of the boundary between the core 52 and the apex 54 in the axial direction. In the tire 22, the disposition of the center Ph of the arc more effectively contributes to reduction of a volume of a portion from the core 52 to the heel face 74. From this viewpoint, in the tire 22, in a case where the center CC of the core 52 is disposed between the heel face 74 and the center Ph of the arc representing the contour of the heel face 74, the center Ph of the arc representing the contour of the heel face 74 is preferably disposed inwardly of the center of the boundary between the core 52 and the apex 54 in the axial direction.

In FIGS. 3A and 3B, reference character TP represents the top of the vent line 78. A double-headed arrow DT represents a distance between one of the vent lines 78 and the other of the vent lines 78. The distance DT is represented as a distance from the top TP of one of the vent lines 78 to the top TP of the other of the vent lines 78.

In the tire 22, in a case where the heel face 74 has two vent lines 78, the distance DT is preferably not less than 2.0 mm and preferably not greater than 4.0 mm from the viewpoint that the appearance quality required as a product and a low fitting pressure are achieved.

The mold 82 for the tire 22 can have the vent holes 106 at a position apart from the vent line grooves 104, which are not shown, not at the position at which the saw cut groove 112 and the vent line groove 104 intersect each other. In this case, a distance from the vent holes 106 to vent line groove 104 is preferably not less than 1 mm. The mold 82 for the tire 22 can have the vent holes 106 at the position at which the saw cut groove 112 and the vent line groove 104 intersect each other and also the position apart from the vent line grooves 104.

In the case the mold 82 for the tire 22 has the vent holes 106 at a position apart from the vent line grooves 104, the vent holes 106 is preferably located outside of the vent line grooves 104 in the radial direction. Therefore, it is prevented that a spew which is formed at the vent holes 106 is bitten between the seat face 70 and the seat S. In the tire 22 produced with the mold 82, an effect from the spew formed at the vent holes 106 to a pressure maintenance performance is reduced. In the case a number of the vent line grooves 104 is more than one, the vent holes 106 is preferably located outside of the outermost vent line grooves 104 in the radial direction.

In the mold 82, a distance from a bead base line (which is not shown) to the vent holes 106 is preferably not less than 2.5 mm and more preferably not less than 4.0 mm and more preferably not less than 5.0 mm from the viewpoint that it is effectively prevented that the spew which is formed at the vent holes 106 is bitten between the seat face 70 and the seat S. The distance from a bead base line to the vent holes 106 is preferably not greater than 9.0 mm and more preferably not less than 8.0 mm and more preferably not less than 7.0 mm from the viewpoint of a venting performance of the vent holes 106.

In the mold 82, the vent holes 106 are preferably located within 3 mm from a boundary between core 52 and apex 54 from the viewpoint of the pressure maintenance performance and the appearance quality.

The mold 82 can also have a connecting cut groove between the vent line grooves 104 and the vent holes 106, in the case that the vent holes 106 is located outside of the vent line grooves 104 in the radial direction. The connecting cut groove can accelerate the vent through the vent holes 106. The mold 82 can increase the appearance quality of the tire 22 without a negative effect to the pressure maintenance performance. The mold 82 can produce the tire 22 well-balanced among the appearance quality, the bead unseating resistance, and the fitting pressure. A width of the connecting cut groove is preferably between 0.3 mm and 1.0 mm. A depth of the connecting cut groove is preferably between 0.3 mm and 1.0 mm. A cross-sectional view of the connecting cut groove is preferably semicircle.

The lower the cross-sectional height of the tire 22 is and the less the cross-sectional width of the tire 22 is, the less deformation allowance of the tire 22 is. Therefore, such a tire 22 is not easily mounted on the rim R. The above-described technique for adjusting the appearance quality, the bead unseating resistance, and the fitting pressure in a well-balanced manner allows the tire 22 to exert a significant effect particularly when a product of a nominal cross-sectional width and a nominal aspect ratio is not greater than 115 mm in the tire 22. The "nominal cross-sectional width" and the "nominal aspect ratio" are the "nominal cross-sectional width" and the "nominal aspect ratio" included in the "nominal tire size" defined in JIS D4202 "Automobile tyres-Designation and dimensions". For example, when the nominal tire size is 205/50R17, the nominal cross-sectional width is 205 mm and the nominal aspect ratio is 50%, and, therefore, the product (205×0.5) of the nominal cross-sectional width and the nominal aspect ratio is 102.5 mm.

As described above, according to the present invention, the pneumatic tire 22 in which the appearance quality, the bead unseating resistance, and the fitting pressure are adjusted in a well-balanced manner can be obtained.

The embodiments described above are in all aspects illustrative and not restrictive. The technical scope of the present invention is not limited to the above-described embodiments, and the technical scope includes all modifications in a range equivalent to the features described in claims.

EXAMPLES

The present invention will be described in more detail below by means of examples, etc. However, the present invention is not limited to these examples.

Example 1

A pneumatic tire (tire size=205/50R17), for a passenger car, having the basic structure shown in FIGS. 1 to 3B and the specifications indicated below in Table 1 was obtained.

In Example 1, the radius Rh of the arc representing the contour of the heel face was 10 mm. The number of the vent lines was two. In Example 1, the number of the saw cuts each connecting between the two vent lines was 12. In the mold, the vent hole was provided at a position at which the vent line groove and the saw cut groove intersected each other. The number of the vent holes was set to be equal to the number of the saw cut grooves.

Example 2

A tire of Example 2 was obtained in the same manner as in Example 1 except that no saw cuts were provided. Also in Example 2, 12 vent holes were provided in the vent line grooves. The vent holes were disposed at the same positions as in Example 1. "N" in the cell for Saw cut in Table 1 indicates that no saw cuts were provided.

Comparative Example 4

A tire of Comparative example 4 was obtained in the same manner as in Example 1 except that the number of the vent lines was one, and no saw cuts were provided. In Comparative example 4, 12 vent holes were provided in one vent line groove. Theses vent holes were disposed at regular intervals.

Comparative Example 1

Figure 7:
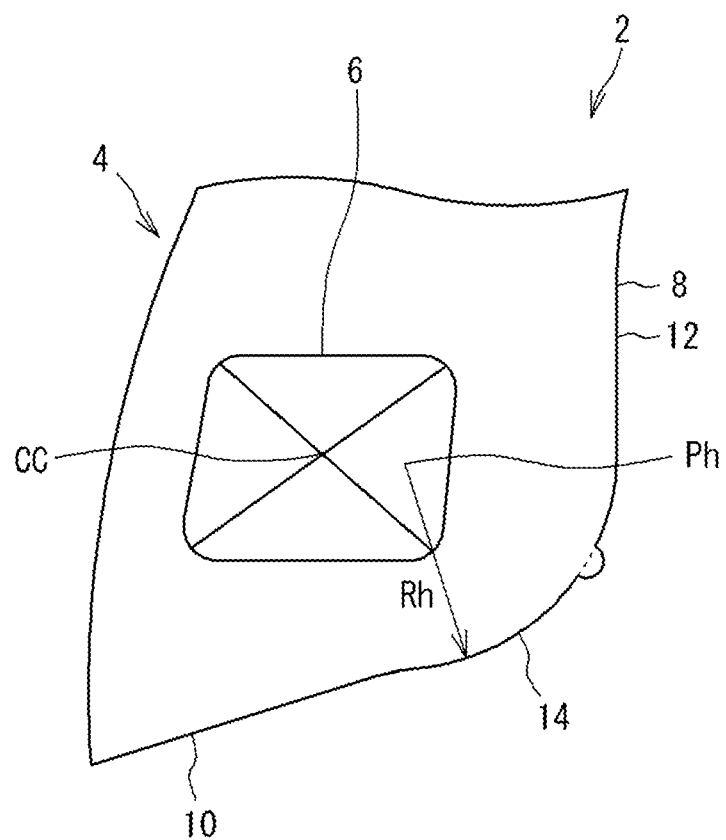
FIG. 7 is an enlarged cross-sectional view of a part of a conventional pneumatic tire.

A pneumatic tire (tire size=205/50R17), for a passenger car, having the basic structure shown in FIG. 7 and the specifications indicated below in Table 1 was obtained. The tire was a conventional tire.

tire does not easily deviate from the rim. The target was set such that the index value was not less than 93.

[Appearance]

The appearance of each bead portion was observed. Whether a defect was present or absent was checked, and an incidence of the defect was confirmed. The result is indicated below in Table 1 as an index with the index of Comparative example 1 being 100. The greater the value is, the higher the incidence is. The target was set such that the index value was not greater than 150.

TABLE 1

|  | Comparative example 1 | Comparative example 2 | Comparative example 3 | Comparative example 4 | Example 2 | Example 1 |
|---|---|---|---|---|---|---|
| Rh [mm] | 6.4 | 6.4 | 6.4 | 10 | 10 | 10 |
| The number of vent lines | 1 | 1 | 1 | 1 | 2 | 2 |
| Saw cut | N | N | N | N | N | 12 |
| Fitting pressure | 100 | 83 | 83 | 51 | 57 | 63 |
| Bead unseating resistance | 100 | 92 | 92 | 100 | 100 | 100 |
| Appearance | 100 | 100 | 100 | 190 | 150 | 113 |

In Comparative example 1, the radius Rh of the arc representing the contour of the heel face was 6.4 mm. The number of the vent lines was one. Therefore, in Comparative example 1, no saw cuts were provided. In Comparative example 1, 12 vent holes were provided in one vent line groove. The vent holes were disposed at regular intervals. The structure of the core of Comparative example 1 was the same as the structure of the core of Example 1.

Comparative Example 2

A tire of Comparative example 2 was obtained in the same manner as in Comparative example 1 except that the inner diameter of the core was increased by 0.23%.

Comparative Example 3

A tire of Comparative example 3 was obtained in the same manner as in Comparative example 1 except that the number of times the wire of the core was wound was reduced by five times (corresponding to one unit).

[Fitting Pressure]

Each tire was fitted to a rim (normal rim), and the tire was inflated with air (supply pressure=600 kPa), to mount the tire on the rim. At the moment the bead portion of the tire moved over the hump of the rim, inflation with air was temporarily stopped, and a pressure (fitting pressure) was measured. The result is indicated below in Table 1 as an index with the index of Comparative example 1 being 100. The greater the value is, the higher the fitting pressure is. The target was set such that the index value was not greater than 86.

[Bead Unseating Resistance]

Each tire was mounted on a normal rim, and the tire was inflated with air to an internal pressure of 230 kPa. A lateral force was applied to the bead portion of the tire in compliance with the test condition defined in FMVSS139, and the lateral force (bead unseating resistance) was measured when the bead portion was unseated from the seat face of the rim. The result is indicated below in Table 1 as an index with the index of Comparative example 1 being 100. The greater the value is, the higher the bead unseating resistance is and the As indicated in Table 1, in Examples, the appearance quality, the bead unseating resistance, and the fitting pressure were adjusted in a well-balanced manner. The evaluation results clearly indicate that the present invention is superior.

The above-described technique for adjusting the appearance quality, the bead unseating resistance, and the fitting pressure in a well-balanced manner is applicable also to various tires.

What is claimed is:

1. A pneumatic tire comprising
a pair of bead portions to be fitted to a rim,
wherein each bead portion comprises a bead, the bead having a ring-shaped core extending in a circumferential direction and an apex disposed radially outward of the core,
wherein an outer surface of the bead portion comprises a seat face disposed radially inward of the bead, a flange face disposed axially outward of the bead, a heel face disposed between the seat face and the flange face, and two vent lines projecting from the heel face and extending in the circumferential direction,
wherein the outer surface of the bead portion comprises at least twelve saw cuts projecting from the heel face, and each of the saw cuts connects between two adjacent ones of the vent lines,
wherein the saw cuts and the vent lines are disposed such that a vent hole in a bead forming surface of a mold for molding the tire is positioned where each of the saw cuts intersects with one of the vent lines,
wherein a contour of the heel face is represented by an arc on a cross-section, of the tire, taken along a plane including a rotation axis of the tire, and
wherein a radius of the arc is not less than 8 mm and not greater than 15 mm.

2. The pneumatic tire according to claim 1, wherein a center of the core is disposed between a center of the arc and the heel face on a cross-section of the tire.

3. The pneumatic tire according to claim 2, wherein the center of the arc is disposed inwardly of a center of a boundary between the core and the apex in an axial direction.

4. The pneumatic tire according to claim 1, wherein a product of a nominal cross-sectional width and a nominal aspect ratio is not greater than 115 mm.

5. The pneumatic tire according to claim 1, wherein the center of the arc is disposed inwardly of a center of a boundary between the core and the apex in an axial direction.

6. The pneumatic tire according to claim 1, wherein a number of saw cuts is equal to a number of the vent holes of the mold.

\* \* \* \* \*